3,133,038
POLYETHYLENE COMPOSITION HAVING INCREASED FLAME RESISTANCE

Heinrich Hahn, Cologne-Deutz, Germany, assignor to Chemische Fabrik Kalk G.m.b.H., Cologne-Kalk, Germany
No Drawing. Filed Feb. 8, 1962, Ser. No. 171,801
2 Claims. (Cl. 260—41)

The present invention relates to a polyethylene composition having increased flame resistance which has an octabromodiphenyl and antimony trioxide admixed therewith.

Based on its ease in processing, its stability against chemical attack and its low electrical conductivity, polyethylene can be among others a valuable raw material for building equipment, for conduits for liquids or for insulation of electric conductors. However, conflicting with these uses of polyethylene is its easy combustibility, for example, polyethylene tubes in a building can spread a fire quickly to other parts of the building. In order that polyethylene may be used for these purposes, the flame resistance of the polyethylene must be increased significantly.

The flame resistance of polyethylene or other plastics can be increased according to known processes by the addition of chloroparaffins and antimony trioxide in certain quantities. Nevertheless, mixtures of chloroparaffins and antimony trioxide with polyethylene have the decisive disadvantage that such mixtures give off hydrochloric acid at temperatures to which they must be heated during subsequent processing. Thereby the desired improvement of the flame resistance of the polyethylene by the addition of chloroparaffins and antimony trioxide is not only impaired, but also considerable corrosion is caused to the apparatus commonly employed in the subsequent processing of the polyethylene. While pure polyethylene after any portion thereof has been heated above ignition temperature by contact with a flame would, of course, continue to burn after removal of the flame, an amount of chlorine is liberated in polyethylene containing antimony trioxide and chloroparaffins at temperatures slightly above the ignition temperature of polyethylene in sufficient quantity to terminate burning of the polyethylene which proceeds as a chain reaction. In addition, the chloroparaffins contained in such a polyethylene composition hinder the continued burning of this mixture only once when any portion of it is heated for a short time to a temperature slightly above the ignition temperature of polyethylene.

However, when the polyethylene mixed with antimony trioxide and chloroparaffins is heated by longer contact of a larger surface with flame to a temperature significantly higher than the ignition temperature of polyethylene, chlorine is released very quickly from the chloroparaffins in a free state, but it is not adequate to prevent the continued burning of polyethylene after completion of a longer contact with flame. This type of contact with flame of a polyethylene is given, for example, during the burning of a structure in which polyethylene tubes or other polyethylene equipment is present. Despite the addition of chloroparaffins and antimony trioxide the polyethylene products would in such instance act as fire spreaders.

In order to hinder decomposition of the chloroparaffins during the processing of the polyethylene admixed therewith, it has been recommended that other compounds be added to the mixture of polyethylene, chloroparaffins and antimony trioxide, as, for example, thiourea, which prevent the premature decomposition of the chloroparaffins. This decomposition inhibiting effect is desired for temperatures in the range in which the polyethylene would be processed to the finished product. Such inhibiting effect, however, also occurs during the burning of such a mixture so that the chlorine evolved from the chloroparaffins is not adequate to hinder the continued burning of the polyethylene after termination of its contact with the flame.

It has also been recommended that hexahalobenzene together with antimony trioxide be added to polyethylene to increase its flame resistance. In contrast to the chloroparaffins, the hexahalobenzenes have the advantage that they are thermally stable and halogen splits off at substantially higher temperatures than in the case of the chloroparaffins. Based on these properties the hexahalobenzenes are suitable to prevent the continued burning of polyethylene heated over its ignition temperature by longer continuous contact with flames. The hexahalobenzenes on account of their thermal stability have the advantage that no corrosion engendering hydrogen chloride is given off from a polyethylene mixed therewith and with antimony trioxide at the temperatures required for the polyethylene processing to finished products and commodities. Despite these advantages which favor the use of hexahalobenzenes for improving the flame resistance of polyethylene, these hexahalobenzenes have the decisive disadvantage that when incorporated in polyethylene together with antimony trioxide they sweat out in large quantities in a short time. The flame resistance of the polyethylene is lowered corresponding to the amount of hexahalobenzenes sweated out, thus no effective and lasting increase of polyethylene's flame resistance can be effected with hexahalobenzenes.

It is an object of this invention to produce polyethylene having inceased flame resistance which is effective and permanent.

According to the invention it was found that polyethylene having such improved flame resistance could be obtained by mixing therewith a combination of solid halogen containing aromatic compounds, namely, octabromodiphenyl and antimony trioxide. Preferably, the polyethylene composition according to the invention contains 5–15% by weight octabromodiphenyl and 5–15% by weight antimony trioxide.

The octabromodiphenyl as well as the antimony trioxide should be dispersed uniformly in the polyethylene in order to effect the greatest possible increase of the flame resistance of the so treated polyethylene. Thus, as an example, low pressure polyethylene that is precipitated from an emulsion polymerization as fine particles can be mixed with octabromodiphenyl and antimony trioxide and subsequently granulated. In high pressure polyethylene the octabromodiphenyl is advantageously added with antimony trioxide during rolling, calendering or extruding. The octabromodiphenyl and the antimony trioxide can be added to the polyethylene also at any other point of its manufacturing or processing in which there is a given opportunity for uniform dispersion of the mentioned additives in the polyethylene.

The particle size of the octabromodiphenyl used has a certain influence upon its effectiveness in increasing the flame resistance of polyethylene. For example, a polyethylene composition which, in addition to antimony trioxide, has octabromodiphenyl of a particle size less than $20\mu$ incorporated therein possesses greater fire resistance than such a composition produced under the same conditions but with octabromodiphenyl having a particle size greater than $20\mu$.

The octabromodiphenyl which is incorporated together with the antimony trioxide in the polyethylene is so thermally stable that it gives off no bromine at temperatures required for the further processing of polyethylene compositions produced according to the invention. The liberation of hydrogen bromide from the octabromodiphenyl which is mixed with antimony trioxide in polyethylene only begins upon contact of the polyethylene with flames and proceeds at such a rate that the flame resistance of the polyethylene remains even after longer contact with flame, and the polyethylene at the conclusion of the contact with the flame immediately ceases to burn. Even when the burning polyethylene melts and drips off, these drops are extinguished at the latest after striking a support. The octabromodiphenyl that is mixed with antimony trioxide in polyethylene practically does not sweat out of the polyethylene produced according to the invention even when stored for longer periods at temperatures of 50° C. Thereby octabromodiphenyl fulfills all the requirements which must be met as an agent for increasing the flame resistance of polyethylene. The combination of octabromodiphenyl with the antimony trioxide increases the flame resistance of polyethylene so that shaped parts made thereof produced according to the invention can be installed in buildings without increasing the danger of fire or can be used for erection of technical apparatus.

Example 1

10 parts by weight of the organic halogen compounds indicated in the following table, 5 parts by weight of antimony trioxide and 2 parts by weight carbon black were mixed into 100 parts by weight polyethylene on a mixing roller at a temperature of 170° C. The sheet pulled off the roller was pressed into 3 mm. thick plates with 90 x 80 mm. edge lengths. The thus produced plates were suspended freely for a month at a temperature of 50° C. Most of the samples then exhibited a whitish coating layer that could be removed easily.

| Organic halogen compound added | Particle size of the halogen compound | Coating after 1 month | Weight Difference of the samples after 1 month, mg. | |
|---|---|---|---|---|
| | | | a[1] | b[2] |
| None | | no | 3.7 | 3.7 |
| Hexabromobenzene | >20μ | yes | 30.0 | |
| Hexabromobenzene | <20μ | yes | 20.0 | 81.5 |
| Octabromonaphthalene | | yes | 43.0 | 90.3 |
| Octabromodiphenyl | >20μ | hardly ascertainable. | 4.0 | 9.3 |

[1] The values in this column were obtained when the whitish coating was removed before weighing, after one month.
[2] The values in this column were obtained when the whitish coating was removed once a week and the sample weighed after one month.

Example 2

10 parts by weight of an organic halogen compound given in the following table, 5 parts by weight of antimony trioxide and 2 parts by weight of carbon black were mixed with 100 parts by weight polyethylene on a mixing roller. The sheet pulled off was pressed to 5 mm. thick plates with a 550 x 50 mm. edge length. These plates were suspended freely in a 120 cm. long tin conduit of square cross-section (40 x 40 cm.) and contacted 4 minutes with a large, just decolorized Bunsen flame.

| Organic halogen compound added | Particle size of the organic halogen compound | Burning time of the sample in seconds after removal from Bunsen flame | Behavior of the dropping off materials |
|---|---|---|---|
| Without | | burns further | burns further. |
| Hexachlorobenzene | | do | Do. |
| Hexabromobenzene | >20μ | do | Do. |
| Hexabromobenzene | <20μ | 10-20 | Do. |
| Octabromonaphthalene | | 8-15 | Do. |
| Octabromodiphenyl | <20μ | 5-10 | does not burn. |

I claim:
1. A flame resistant polyethylene composition comprising polyethylene, 5–15% by weight octabromodiphenyl and 5–15% by weight antimony trioxide.
2. A flame resistant polyethylene composition comprising polyethylene, 5–15% by weight octabromodiphenyl having a particle size less than 20μ and 5–15% by weight antimony trioxide.

References Cited in the file of this patent

UNITED STATES PATENTS

| | | |
|---|---|---|
| 1,972,447 | Jenkins et al. | Sept. 4, 1934 |
| 2,480,298 | Happoldt | Aug. 30, 1949 |
| 2,775,615 | Patrick | Dec. 25, 1956 |